Patented Sept. 4, 1923.

1,467,022

UNITED STATES PATENT OFFICE.

CHARLES F. WALTON, JR., AND HOWARD S. PAINE, OF WASHINGTON, DISTRICT OF COLUMBIA, DEDICATED, BY MESNE ASSIGNMENTS, TO THE PEOPLE OF THE UNITED STATES.

FOOD SIRUP AND PROCESS OF PREPARING SAME.

No Drawing.   Application filed July 26, 1922.   Serial No. 577,754.

(FILED UNDER THE ACT OF MARCH 3, 1883, 22 STAT. L., 625.)

*To all whom it may concern:*

Be it known that we, CHARLES F. WALTON, Jr., and HOWARD S. PAINE, citizens of the United States of America, and employees of the Department of Agriculture of the United States of America, residing at Washington, District of Columbia, have jointly invented Food Sirups and Processes of Preparing Same, of which the following is a specification.

This application is made under the act of March 3, 1883, chapter 143 (22 Stat., 625) and the invention herein described and claimed may be used by the Government of the United States, its officers and employees, and by any person in the United States either in public or private work without payment to us of any royalty thereon.

Our invention relates to the preparation of a heavier density pure maple sirup by the partial inversion of the sucrose present, whereby increased solubility of the sugars contained therein is accomplished. Owing to the hydrolysis of a certain proportion of its sucrose content, the sirup can be boiled thicker than would otherwise be possible in a pure maple product without crystallization, and because of its greater density the sirup possesses improved keeping qualities.

Our process consists in treating the semi-sirup during manufacture, or a solution of maple sugar in water, with the enzyme invertase, either together with or without a small amount of some organic or mineral acid. At the end of the inversion period the semi-sirup is evaporated to final density either at atmospheric or under diminished pressure. The delicate maple flavor of the sirup is less affected by this process of inversion than by other known methods.

Our process may be described in detail as follows:

The maple sap is concentrated in the usual manner to a density preferably of 60° Brix at 20° C., but the degree of concentration may be more or less, and after cooling to 60° C. sufficient invertase is added to either completely or partially invert the sucrose present in any desired length of time. We have found it preferable under ordinary conditions to completely invert the sucrose, using for this purpose 5 cc. of glacial acetic acid and 36 cc. of invertase, the activity of $k$ value of which is 0.40–0.45 (J. Am. Chem. Soc., vol. 32, p. 776, June, 1910) for every 10 gallons of semi-sirup and permitting the sirup to stand for 24 hours. The amount of invertase used may be reduced one-half by doubling the time period, or it may be reduced by insulating the tank in which the sirup is held so that the drop in temperature will be less rapid, or means may be provided for supplying heat to maintain the temperature at approximately 55–60° C., thereby securing increased efficiency of the invertase. After complete inversion, maple sirup of ordinary density (67–68 Brix) is added in the proportion of 9 gallons to every 10 gallons of the inverted sirup, and the mixture is evaporated to the desired density—preferably 40–42° Baumé at 20 C. or 35–37° Baumé at the boiling temperature. Maple sugar may be added in the place of sirup, 65–70 pounds being dissolved in the inverted sirup to give the proper purity. The use of maple sugar reduces the amount of evaporation necessary, but is somewhat objectionable owing to the fact that because it is not completely soluble it imparts a cloudy or turbid appearance to the finished product.

Provided the factory is equipped to control the inversion by chemical analysis, the "apparent purity" (i. e. ratio of direct polarization to total solids, the latter being determined by Brix or Baumé hydrometer) is reduced to 35–40, after which the semi-sirup is concentrated to final density without the addition of untreated sirup.

It is essential to heat the sirup containing the invertase to a high temperature—at least 100° C. and preferably to the boiling point at atmospheric pressure to destroy the activity of the enzyme. This is ordinarily accomplished by open evaporation, but if concentration is done in vacuo the temperature should be raised to 100° C. before diminishing the pressure. The glacial acetic acid or other acid is used to increase the activity of the enzyme since invertase exhibits its maximum activity in a slightly acid medium (0.001–0.002 N). The acid itself has practically no action by way of inverting sucrose, since it is used in such small amount.

Maple sugar may be dissolved in water and the process conducted substantially as described for sirup that is being made directly from maple sap.

Having thus described our invention we claim:

1. A process for preparing a sirup of high density from maple sirup, consisting in treating maple sirup with invertase to secure partial inversion of the sucrose in the maple sirup.

2. A new and useful product which comprises a mixture of maple sirup and invert sugar.

In testimony whereof, we affix our signatures in the presence of two subscribing witnesses.

CHARLES F. WALTON, Jr.
HOWARD S. PAINE.

Witnesses:
JOHN HAMILTON,
JOSEPH COHEN.